US010881981B2

(12) United States Patent
Streng et al.

(10) Patent No.: US 10,881,981 B2
(45) Date of Patent: Jan. 5, 2021

(54) METHOD FOR PRODUCING A POLYCARBONATE USING A STRIPPING DEVICE

(71) Applicant: EPC Engineering & Technologies GMBH, Arnstadt (DE)

(72) Inventors: Michael Streng, Maintal (DE); Dieter Kloos, Aschaffenburg (DE); Malte Bracht, Norden (DE)

(73) Assignee: EPC ENGINEERING & TECHNOLOGIES GMBH

( * ) Notice: Subject to any disclaimer, the term of this patent is extended or adjusted under 35 U.S.C. 154(b) by 50 days.

(21) Appl. No.: 16/326,092

(22) PCT Filed: Aug. 11, 2017

(86) PCT No.: PCT/EP2017/070430
§ 371 (c)(1),
(2) Date: Feb. 15, 2019

(87) PCT Pub. No.: WO2018/041602
PCT Pub. Date: Mar. 8, 2018

(65) Prior Publication Data
US 2019/0209946 A1 Jul. 11, 2019

(30) Foreign Application Priority Data
Aug. 29, 2016 (DE) .................. 10 2016 116 078

(51) Int. Cl.
*B01D 3/34* (2006.01)
*C08G 64/30* (2006.01)
*B01D 3/00* (2006.01)
*C08G 64/06* (2006.01)
*C08G 64/20* (2006.01)

(52) U.S. Cl.
CPC ............ *B01D 3/346* (2013.01); *B01D 3/009* (2013.01); *C08G 64/06* (2013.01); *C08G 64/205* (2013.01); *C08G 64/307* (2013.01)

(58) Field of Classification Search
USPC ........................................................ 528/204
See application file for complete search history.

(56) References Cited

U.S. PATENT DOCUMENTS

| 6,545,187 B1 | 4/2003 | Kissinger et al. |
| 8,022,240 B2 | 9/2011 | Ooms et al. |
| 2011/0105708 A1 | 5/2011 | Benderly et al. |

FOREIGN PATENT DOCUMENTS

| DE | 2439552 A1 | 2/1976 |
| DE | 68906719 T2 | 10/1993 |
| DE | 19903459 A1 | 8/2000 |
| EP | 0343349 B1 | 3/1989 |
| WO | WO-2016001164 A1 | 1/2016 |

OTHER PUBLICATIONS

Internationale Recherchenbehörde (International Search Report) for PCT/EP2017/070430, dated Jan. 11, 2018.
Schnell, "Chemistry and Physics of Polycarbonates, Polymer Reviews," vol. 9, Interscience Publishers, New York, London, Sydney 1964.
Prevorsek, et al., "Synthesis of Poly(ester)carbonate Copolymers", Journal of Polymer Science: Polymer Chemistry Edition, vol. 18, 75-90 (1980).
Freitag, et al., "Polycarbonates", Encyclopedia of Polymer Science and Engineering, vol. 11, second edition, 1988, pp. 648-718.
Grigo, U., et al., "Polycarbonate" in Becker/Braun, Kunststoff-Handbuch, vol. 3/1, Polycarbonate, Polyacetale, Polyester, Celluloseester, Carl Hanser Verlag Munich, Vienna 1992, pp. 117-299.
International Searching Authority, Written Opinion for PCT/EP2017/070430, dated Jan. 11, 2018 (English translation).

*Primary Examiner* — Terressa Boykin
(74) *Attorney, Agent, or Firm* — Winstead PC

(57) ABSTRACT

A method is described for producing a polycarbonate by reacting one or more diaryl carbonates with one or more aromatic hydroxy compounds, which are first mixed in a mixing device and enter, as a raw material mixture, a raw material mixture container to subsequently react in one or more reactors under reduced pressure and increased temperature to form polycarbonate, wherein the mixture of diaryl carbonate and aromatic hydroxy compound is subjected to a purification by an inert gas in a countercurrent process, in a stripping device, before entering the raw material mixture container. The present invention also relates to a stripping device which is particularly suitable for purifying a raw material mixture stream, and to the use of such a stripping device in a method for producing polycarbonate.

17 Claims, 3 Drawing Sheets

METHOD FOR PRODUCING A POLYCARBONATE USING A STRIPPING DEVICE

Figure 1:
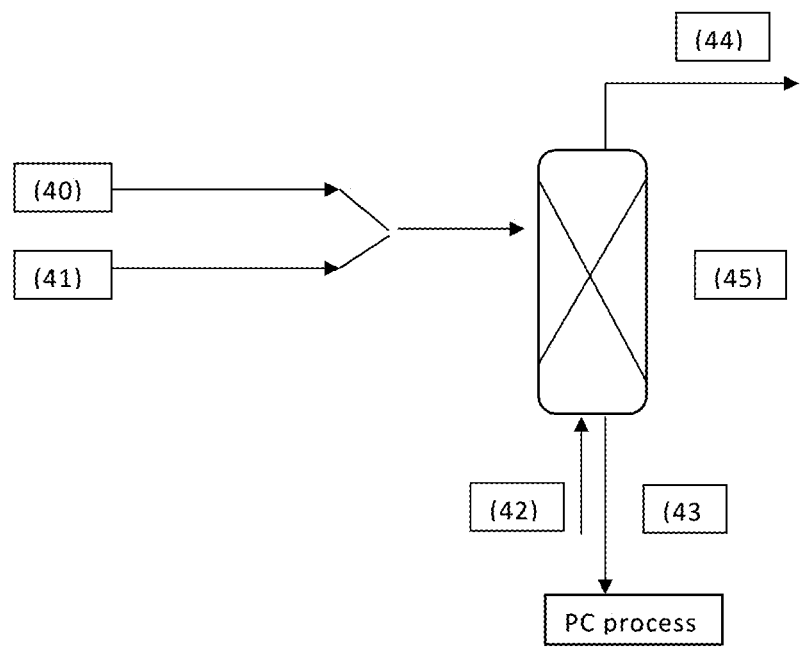

The present invention relates to a process for producing a polycarbonate by reaction of one or more diaryl carbonates with one or more aromatic hydroxy compounds, wherein diaryl carbonate and the aromatic hydroxy compound are first mixed in a mixing device and then enter, as a raw material mixture, a raw material mixture container to subsequently react in one or more reactors under reduced pressure and increased temperature to form polycarbonate, wherein the mixture of diaryl carbonate and the aromatic hydroxy compound is subjected to purification before entering the raw material mixture container. The present invention also relates to a stripping device which is particularly suitable for the purification of a raw material mixture stream, and the use thereof.

Aromatic polycarbonate is an economically interesting plastic which has numerous applications owing to its good mechanical and optical properties. Applications can be found, for example, in the automotive industry, in medical technology as well as in the packaging industry, as well as many more.

At present, the manufacture of aromatic polycarbonate on an industrial scale is accomplished either by a surface process or by a melt process.

In the so-called surface process, an aromatic hydroxyl is reacted with phosgene, an aqueous alkali and a solvent to polycarbonate and by addition of a catalyst. The polycarbonate is obtained in solution and is subsequently concentrated in several purification steps.

In the melt process, at least one aromatic hydroxy compound, preferably bisphenol A, is reacted with at least one diaryl carbonate, preferably diphenyl carbonate, to give polycarbonate. For this purpose, the liquid raw material streams are mixed and reacted, with addition of catalysts, at increased temperature and reduced pressure to form polycarbonate.

The production of polycarbonates according to said melt transesterification process, is known and described, for example in "Schnell", Chemistry and Physics of Polycarbonates, Polymer Reviews, vol. 9, Interscience Publishers, New York, London, Sydney 1964; in D. C. Prevorsek, B. T. Debona and Y. Kersten, Corporate Research Center, Allied Chemical Corporation, Moristown, N.J. 07960, "Synthesis of Poly(ester)carbonate Copolymers" in Journal of Polymer Science, Polymer Chemistry Edition, vol. 19, 75-90 (1980); in D. Freitag, U. Grigo, P. R. Müller, N. Nouvertne, BAYER AG, "Polycarbonates" in Encyclopedia of Polymer Science and Engineering, vol. 11, second edition, 1988, pages 648-718; and finally in Dres. U. Grigo, K. Kircher and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

The reaction occurring during the preparation of polycarbonates from bisphenols and diaryl carbonates is represented by the following equation:

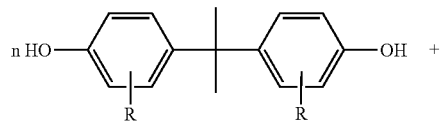

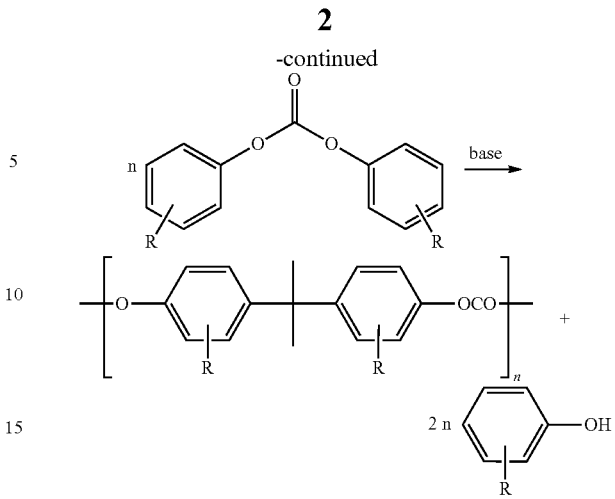

Recently, the melt process is increasingly used, primarily due to the lower amount of effluent and since there is no need to use toxic phosgene.

However, it is of utmost importance for the melt process to use raw materials of high purity, in order to be able to produce a high quality polycarbonate. The impurities may include, on the one hand, unseparated substances from the manufacturing process of the raw materials, such as phenol, acetone, water, catalyst residues, phenyl salicylates, methoxyphenyl benzoates, phenyl methyl carbonate, dimethyl carbonates. On the other hand, impurities can be generated as a result of decomposition reactions of the raw materials.

As a result of the number of possible impurities, there can also arise a plurality of reaction paths wherein these may cause structural changes to the product. These include, in particular, those changes which affect the chain structure and/or the chain length. In contrast to discolorations, which can be rectified by means of colorants, alterations of the chain structure and/or the chain length result in altered or deteriorated rheological properties which cannot be remedied afterwards; in the worst case, these changes mean a complete loss of production for the manufacturer.

It is common knowledge that certain contaminants can become part of the polymer chain and alter its linear structure by branching and cross-linking. The deviations then lead to undesirable altered mechanical and optical properties. This problem is generally known as FRIES rearrangements, and is a particular issue with the presence of water and other volatile compounds formed from thermal decomposition reactions in BPA.

In addition, catalyst residues can lead to undesirable side reactions which cause decomposition or conversion of raw materials, and, thereby, change the required specific molar ratio between the carbonyl and the hydroxyl component. A change in the molar specific ratio between the carbonyl and the hydroxy component, can lead to the fact that the chain length desired cannot be established due to a lack of functional end groups. In addition, certain impurities or components generated by side reactions can cause chain growth to stop, since these components bond to the polymer chain but fail to provide the functional groups which are required for further chain growth.

In order to produce a high quality polycarbonate, it is therefore of utmost importance to ensure the required purities of the raw materials.

Owing to the great industrial importance of polycarbonate, there are numerous solution approaches for this.

U.S. Pat. No. 7,112,703 "Production of Bisphenol-A with reduced sulfur content" describes the separation of water by a vacuum distillation and, inter alia, by a subsequent desorption process.

The patent specification DE11201300204 "Verfahren zur Herstellung von Bisphenol A" describes a production process of BPA in which volatile impurities, such as phenol, acetone and water, are separated by distillation.

In the patent specification U.S. Pat. No. 8,247,619 "BPA and Polycarbonate made from renewable materials", the purification of BPA by stripping to reduce impurities, in particular phenol, is described.

The patent specification U.S. Pat. No. 7,078,573 "Dewatering of circulatory flows in the production of Bisphenol A" describes the separation of water from BPA by a distillation column operated under vacuum.

EP0475893 (B1) describes a process which purifies bisphenol A by fractional melt crystallization, in order to use it for the production of polycarbonates.

JP5862728 (B2) attempts to reduce the sensitivity to impurities or to improve the product properties by selecting a specific hydroxy component.

EP1964831 (A1) describes the preparation of diphenyl carbonate and a subsequent multi-stage purification by distillation.

WO2014141107 (A2) describes that catalyst residues of DPC preparation are reduced by means of steam and a subsequent precipitation reaction.

In DE2439552, it is described that premature mixing of the hydroxy and diaryl component improves the polycarbonate quality.

A disadvantage of the previous solution approaches is the fact that the raw material purification installations are often part of the raw material production plants and are, therefore, spatially separated from the polycarbonate manufacturing plant. This spatial distance results in residence times attributable to the transport from the raw material production plant to the polycarbonate production plant, wherein impurities can be formed again or can be newly introduced.

Another disadvantage is that the respective raw material components are separately purified in the established methods, which in turn requires intermediate storage containers and causes unfavorable residence times.

A further disadvantage is that the established purifying systems are often very energy-intensive, since a single or multiple changes of the physical state of the major raw material portion is required.

The object of the present invention is to overcome the above mentioned disadvantages of the prior art processes.

According to the invention, this object is achieved by a process for producing a polycarbonate by reaction of one or more diaryl carbonates with one or more aromatic hydroxy compounds, wherein diaryl carbonate and aromatic hydroxy compound are first mixed in a mixing device and enter, as a raw material mixture, a raw material mixture container to subsequently react in one or more reactors under reduced pressure and increased temperature to form polycarbonate, wherein the mixture of diaryl carbonate and aromatic hydroxy compound passes through a stripping device in which the raw material mixture is purified by a gas in a countercurrent process before entering the raw material mixture container.

Surprisingly, it has been found that it is advantageous to use a countercurrent process with a gaseous component for the separation of impurities from a raw material mixture of the polycarbonate production. As a result, the raw material quality can be improved with relatively little effort or impact on energy and equipment requirements.

The mixing of the raw materials results in an improved mass transfer, and thus less equipment and energy expenditure than would be the case for the pure hydroxy compound raw material stream. Moreover, the solidification point of the mixture is below that of the aromatic hydroxy compound component, meaning that an additional input of heat to compensate for the evaporation loss is not necessary. In addition, the diaryl carbonate component stabilizes the aromatic hydroxy compound component.

According to the invention, a liquid diaryl carbonate stream, preferably diphenyl carbonate, is mixed with a liquid aromatic hydroxy compound raw material stream, preferably bisphenol A, in a mixing device. The mixed raw material stream is then introduced into a stripping device. At the same time, a gas flow is introduced into the stripping device from below, so that a countercurrent is created. Preferably, the stripping device contains specific installations which serve to distribute the liquid stream, as best as possible, over the cross-section of the container, and to increase the contact area of the liquid stream and the gaseous stream. The pressure of the stripping device is regulated via a regulating fitting in the gas outlet line. In particular, the volatile impurities are transferred into the gaseous stream by contact of the liquid stream with the gaseous stream in countercurrent flow. The purified liquid stream is then transferred, by means of gravimetric transport, into a raw material mixture container, from where it is fed to the reactors of the polycarbonate production plant.

The diaryl carbonate raw material stream can be obtained directly from a diaryl carbonate production plant, with or without a separate purification plant, in which the raw material stream is processed. The raw material stream of the aromatic hydroxy compound may either have been melted beforehand from a solid, with or without a separate purification system, or be provided directly from the production plant as a liquid stream, with or without a separate purification system. The individual raw material streams can be mixed in different ratios by means of a mixing device, typically the molar ratio of diaryl carbonate component to hydroxy component is greater than one. However, ratios of less than one or equal to one, are also conceivable, depending on the requirements of the process. Of course, further components can be added to the diaryl carbonate liquid stream and/or to the aromatic hydroxy compound raw material stream and/or to the mixed raw material stream.

The stripping device typically has a height to diameter ratio of greater than one. Ideally, the stripping device is insulated and heated. The heating can be performed by a double jacket, with thermal oil or steam heating or by an electric trace heating. The specific installations can be designed as pipes, as packings, as trays or as gauze packings. Ideally, structured gauze packagings are used. In addition, heating elements may be part of the installations.

In a preferred embodiment, the process of the invention is designed so that the purification of the raw material stream in the stripping device takes place under reduced pressure, in particular under a pressure of less than 700 mbar a; more preferably less than 600 mbar a; still more preferably under a pressure of less than 100 mbar a; and most preferably under a pressure of less than 60 mbar a; in particular between 50 mbar a and 10 mbar a.

In a preferred embodiment, the method according to the invention is designed such that one or more inert gases are used as the gas.

In a particularly preferred embodiment, the method according to the invention is designed such that nitrogen is used as the gas.

However, other inert substances may be used as well, singly or in combination, such as $CO_2$, argon, helium. In addition, it is conceivable to heat or to cool the gas stream before feeding it into the container. It is also possible to treat the gas stream after exiting the container and to recirculate it. The gaseous stream can be varied according to the expected contamination and/or the liquid flow, or the throughput of the plant.

In a preferred embodiment, the method according to the invention is designed so that purifying the raw material stream in the stripping device takes place under elevated temperature; in particular above a temperature of 85° C.; preferably above a temperature of 120° C.; still more preferably above a temperature of 145° C. and most preferably at a temperature between 150° C. and 165° C.

In a preferred embodiment, the method according to the invention is designed so that purifying the raw material stream in the stripping device takes place under increased temperature and reduced pressure, especially at a temperature between 150° C. and 165° C. and at a pressure of between 50 mbar a and 10 mbar a.

In a preferred embodiment, the process according to the invention is designed such that the ratio of liquid to gaseous mass flow, expressed in kg/h, in the stripping device is greater than 100, preferably greater than 1,000, more preferably greater than 2,500 and still more preferably between 3,000 and 113,000.

However, the skilled person should further consider that not only does a relationship between the liquid stream and the gas stream exist, but also between the impurities in the liquid stream and the gas stream, which, therefore, can affect the gas flow.

In a particularly preferred embodiment, the method according to the invention is designed such that the stripping device comprises a column zone with structured packings.

The structured packings in the column zone increase the contact area between liquid and gaseous stream, thus increasing the efficiency of the purification.

In a particularly preferred embodiment, the process according to the invention is designed so that the stripping device includes a preheating zone, which is downstream with respect to the column zone in the direction of the raw material mixture stream.

Such a preheating zone downstream of the column zone, has the advantage that a preheating of the gas stream takes place before the gas stream in the column zone comes into intense contact with the liquid raw material stream. By virtue of the fact that the stripping device is typically operated under vacuum and that a strong relaxation of the gas stream, typically nitrogen, occurs, in relation to the pressure of the gas in the supply line, such a preheating zone can significantly enhance the efficiency of the purification process, since overly excessive cooling of the expanded gas is avoided.

In a particularly preferred embodiment, the method according to the invention is designed such that the column zone of the stripping device is heated. Heating of the column zone can also enhance the efficiency of the purification process.

In a preferred embodiment, the method according to the invention is designed such that the gas is introduced into the stripping device via the raw material mixture container. It has been shown that feeding the gas stream via the raw material mixture container leads to particularly good results, since contact between the raw material stream and the gas stream will occur downstream of the stripping device; this leads to a certain purifying effect and, moreover, causes preheating of the gas stream.

In a preferred embodiment, the process according to the invention is designed such that dihydroxydiarylalkanes of the formula HO—Z—OH are used as the aromatic hydroxy compound, wherein Z is a divalent organic residue having 6 to 30 carbon atoms which contains one or more aromatic groups.

In a preferred embodiment, the process according to the invention is designed such that di-($C_6$ to $C_{14}$ aryl) carbonic acid esters are used as the diaryl carbonate.

In a preferred embodiment, the process according to the invention is designed such that bisphenol A is used as aromatic hydroxy compound and diphenyl carbonate as the diaryl carbonate.

In a preferred embodiment, the inventive method is designed such that the mixing device for mixing the raw material streams, consists of a so-called static mixer as part of a tubing.

In addition, in a particularly preferred embodiment, the method according to the invention can be designed such that the mixing device for mixing the raw material streams, consists of a raw material mixing container in which the raw material streams are fed and mixed continuously or batchwise.

In addition, the present invention also relates to a stripping device, in particular for purifying a raw material mixture stream by a gas in the countercurrent process in a process for producing polycarbonate, wherein the stripping device has a column zone with structured packings and a preheating zone for preheating the gas.

Such a stripping device can, in particular, be used for use in a process for the preparation of polycarbonate.

The stripping device typically has a height to diameter ratio of greater than one. Ideally, the stripping device is insulated and heated. The heating can be carried out by a double jacket, with thermal oil or steam heating or by an electric trace heating. The specific installations can be designed as pipes, as packings, as trays or as gauze packings. Ideally, structured gauze packings are used. In addition, heating elements may be part of the installations.

In a particularly preferred embodiment, the stripping device according to the invention is designed such that it can be connected via weld lip seals and sealed in a vacuum-tight manner.

It has been found that the connection of the stripping device via weld lip seals provides advantages compared to the graphite seals commonly used. This is particularly the case as the stripping device is typically operated under vacuum.

In a preferred embodiment, the stripping device according to the invention is designed so that the housing and structured packings in the column zone are made of stainless steel 904L, or of higher quality. The use of stainless steel, in particular 904L or of higher quality, results in increased durability of the stripping device and prevention of corrosion and reduction of discoloration of the raw material.

The implementation of the invention is not limited to a single purification of the liquid raw material stream. Of course, it is also conceivable to circulate the raw material mixture continuously, or batchwise, from the following raw material container via the container.

FIG. 1 shows a schematic representation of the method according to the invention. The schematic representation shows the principle of countercurrent purification in a column zone of the stripping device.

| FIG. 1 | |
|---|---|
| No. | description |
| 40 | diaryl carbonate component |
| 41 | aromatic hydroxyl component |
| 42 | gaseous countercurrent component |
| 43 | raw material stream |
| 44 | exhaust gas stream |
| 45 | countercurrent column |

Figure 2:
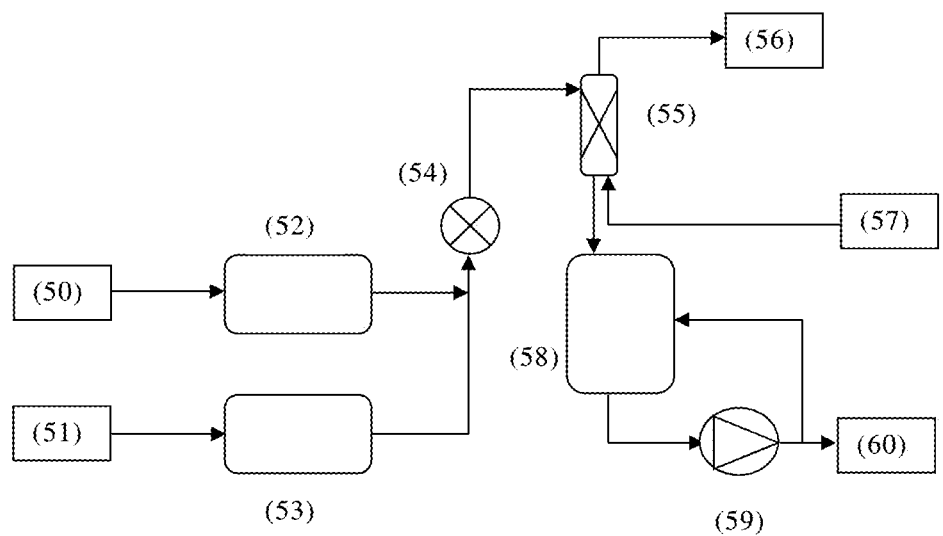

A particularly preferred embodiment of the method according to the invention is shown in FIG. 2:

| FIG. 2 | |
|---|---|
| No. | description |
| 50 | bisphenol A production |
| 51 | diphenyl carbonate production |
| 52 | bisphenol A raw material container |
| 53 | diphenyl carbonate raw material container |
| 54 | mixing device |
| 55 | countercurrent column |
| 56 | vacuum system |
| 57 | nitrogen supply |
| 58 | raw material mixture container |
| 59 | raw material pump |
| 60 | first reaction system |

The individual raw material streams are fed from the respective production plant (50) and (51) into storage containers (52) and (53). The raw material streams fed from the storage containers are then combined in a specific molar ratio and mixed with a mixing device (54). The raw material mixture is then fed into the stripping device (55). At the same time, nitrogen from the nitrogen supply (57) is fed in countercurrent from below into the stripping device (55). Impurities accumulate in the nitrogen stream by contact with the liquid countercurrent. The enriched gas stream leaves the stripping device at the head and is forwarded to the vacuum system (56). The purified raw material stream exits at the bottom of the stripping device (55) into a raw material mixture container (58). The raw material mixture is fed to the first reaction system (60) by means of raw material pump (59).

Figure 3:
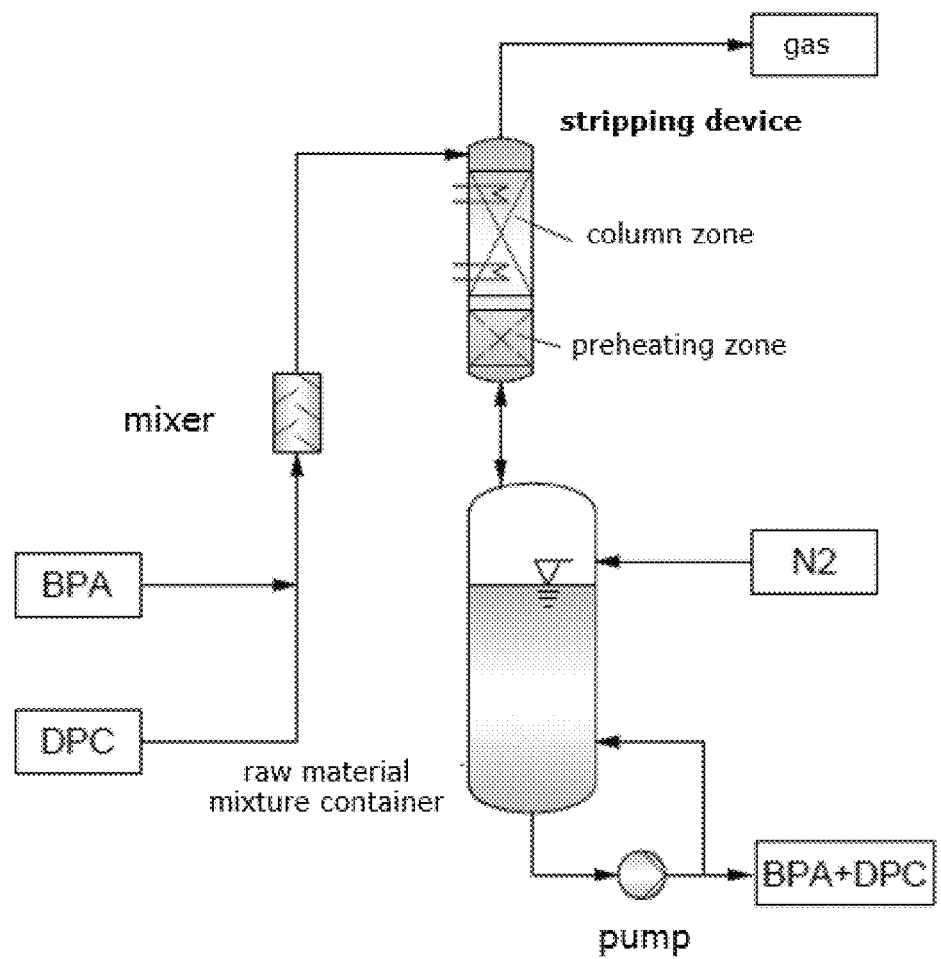

FIG. 3 shows a particularly preferred embodiment of the method according to the invention, in which the stripping device has a preheating zone and the gas in the form of nitrogen is introduced via the raw material mixture container.

The invention claimed is:

1. A process for producing a polycarbonate by reaction of one or more diaryl carbonates with one or more aromatic hydroxy compounds, comprising:
   first mixing diaryl carbonate and aromatic hydroxy compound in a mixing device; and
   entering, as a raw material mixture, a raw material mixture container to subsequently react in one or more reactors under reduced pressure and increased temperature to form polycarbonate,
   wherein the mixture of diaryl carbonate and aromatic hydroxy compound passes through a stripping device in which the raw material mixture is purified by a gas in a countercurrent process before entering the raw material mixture container.

2. The process according to claim 1, comprising the purifying of the raw material stream in the stripping device under reduced pressure, in particular under a pressure of less than 700 mbar.

3. The process according to claim 1, using one or more inert gases as the gas.

4. The process according to claim 1, characterized in that nitrogen is used as the gas.

5. The process according to claim 1, characterized in that the ratio of liquid to gaseous mass flow, expressed in kg/h, in the stripping device is greater than 100.

6. The process according to claim 1, characterized in that the stripping device has a column zone with structured packings.

7. The process according to claim 6, characterized in that the stripping device has a preheating zone which is downstream with respect to the column zone in the direction of the raw material mixture stream.

8. The process according to claim 6, characterized in that the column zone of the stripping device is heated.

9. The process according to claim 1, characterized in that the gas is introduced into the stripping device via the raw material mixture container.

10. The process according to claim 1, characterized in that dihydroxydiarylalkanes of the formula HO—Z—OH, wherein Z is a divalent organic residue having 6 to 30 carbon atoms, which contains one or more aromatic groups, are used as the aromatic hydroxy compound.

11. The process according to claim 1, characterized in that di-($C_6$ to $C_{14}$ aryl) carbonic acid esters are used as the diaryl carbonate.

12. The process according to claim 1, characterized in that bisphenol A is used as aromatic hydroxy compound and diphenyl carbonate is used as diaryl carbonate.

13. A stripping device for purification of a raw material mixture stream by a gas in a countercurrent process in a process for the production of polycarbonate, wherein the stripping device comprises a column zone with structured packings and a preheating zone for preheating the gas, wherein the stripping device is designed so that it can be connected and sealed vacuum-tight via weld lip seals.

14. The stripping device according to claim 13, characterized in that the column zone is heated.

15. The stripping device according to claim 13, characterized in that the housing and the structured packings in the column zone are made of stainless steel 904L or of higher quality.

16. A method of using a stripping device according to claim 13 in a process for producing polycarbonate.

17. The stripping device according to claim 13, characterized in that the housing and the structured packings in the column zone are made of stainless steel 904L or of higher quality.

* * * * *